W. B. RAPER.
Improvement in Cultivators.
No. 5,018. Reissued July 30, 1872.
Fig. 2.
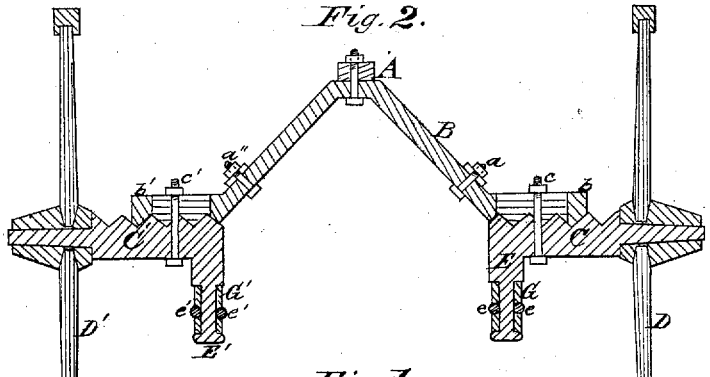
Fig. 1.
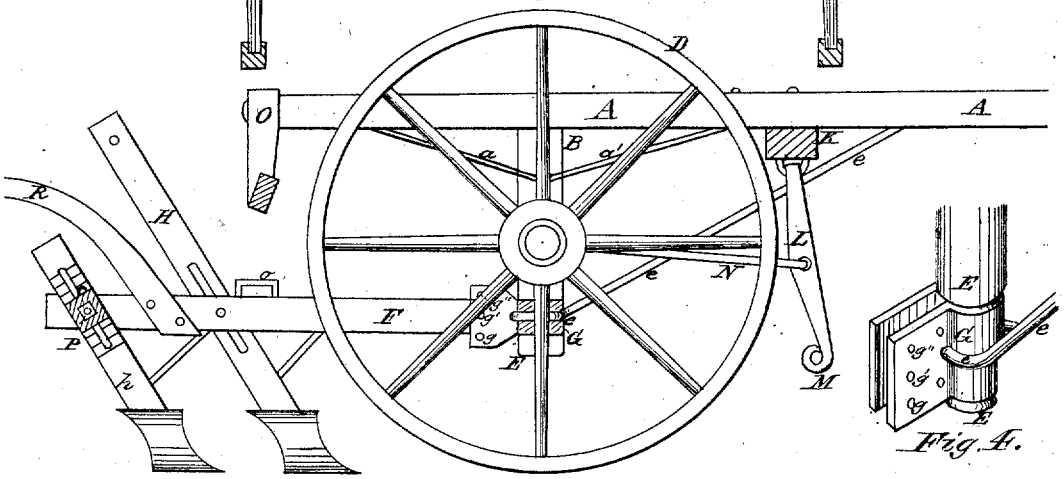
Fig. 4.
Fig. 3.
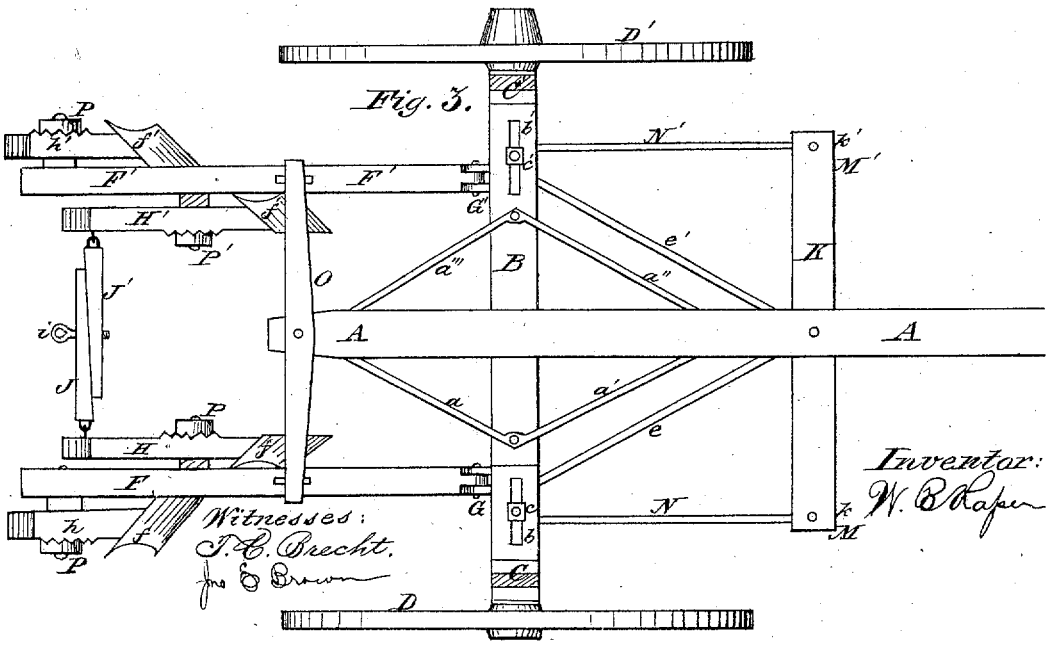
Witnesses:
T. C. Brecht.
Jno. C. Brown
Inventor:
W. B. Raper
AM. PHOTO-LITHOGRAPHIC CO. N.Y. (OSBORNE'S PROCESS.)

UNITED STATES PATENT OFFICE.

WILLIAM B. RAPER, OF CARTHAGE, ILLINOIS, ASSIGNOR TO JOHN JACKSON.

IMPROVEMENT IN CULTIVATORS.

Specification forming part of Letters Patent No. 98,708, dated January 11, 1870; reissue No. 5,018, dated July 30, 1872.

*To all whom it may concern:*

Be it known that I, WM. B. RAPER, of Carthage, Hancock county, Illinois, have invented certain new and useful Improvements in Corn Plows or Cultivators, of which the following is a specification:

My invention relates to that class of corn-plows which pass over a row of plants and plow both sides, being drawn by two horses and supported by two wheels; and consists of an improvement in the axle-beam so that the wheels can be moved nearer to and further from each other, the devices by which the plows are elevated and depressed, and in the general arrangement and combination of the various parts, as will hereafter be more fully set forth.

Figure 1 is a side elevation of my plow. Fig. 2 is a section view. Fig. 3 is a plan view, and Fig. 4 is a perspective of the double-hinged joint on end of plow-beams and pivot-arms.

A is the tongue or draft-pole, having secured to it, near its rear end, the adjustable part of the axle-beam B. The beam B and tongue may be formed of wood, in separate parts, or may be cast of metal in a single piece, as may be desired. The ends of the adjustable bent axle B are made to extend outward, having a serrated surface on their under sides, and elongated slots cut through them so as to receive the bolts *c c'*. The adjustable parts of the axle C C', to which the wheels D D' are attached, have corresponding serrations formed on the upper sides, so as to fit into those formed on the lower sides of the adjustable part B. In the cultivation of corn, cotton, tobacco, and many other products, the distances between the rows of plants are by no means uniform, but are varied for many reasons—frequently from different notions and ideas of the farmers and planters themselves, but more generally on account of the difference in soil and climate and the size which the plant may be expected to attain when matured. The larger the plant the greater the distance between the rows, and the same planter may have the same product planted on the same farm in rows of different distances apart, to suit the fertility of the different fields he is cultivating. To meet the necessity for cultivators adapted to rows of varying distances, and to save the expense of providing separate improvements, I have constructed the axle-beam of my corn plow or cultivator in such a manner that the two wheels can be moved nearer to or further from each other, so as to suit the wishes of the planter or the necessity of the case. In regard to the necessity and utility of the contraction and expansion of the distances between the wheels, (carrying the plows with them,) I might say, in addition, that even in the cultivation of the same crop of corn, cotton, or tobacco, it is necessary to increase the distance between the plows in proportion to the growth of the plant. For instance, in the early part of the season, when the plant is small, the plows should be near together, and then the wheels are brought to the desired distance and firmly secured by the serrations and bolts; and when the plant has arrived at a larger growth the plows are again adjusted and expanded from time to time to accord with the increased size of the plant. The inner ends E of the beams C C' are turned downward so as to act as pivot-arms for the plow-beams F, to which they are connected by the double-hinged joints or pivots G, which play around the lower ends of the pivot-arm E, thereby allowing a lateral motion from side to side, enabling the plowman to swing the plows around stumps, stones, or any plant which may be out of line in the row. These double-hinged joints or pivots G have a series of holes, *g g' g''*, formed in them for the reception of the bolt or pin, which fastens (through a corresponding hole in the front ends of the plow-beams) the front ends of the plow-beams F into the double-hinged joints G, and thereby securing the connection between the plow-beams F F' and the pivot-arms E E', at the same time permitting a free vertical movement of plow-beams and plows in addition. By means of the several holes *g g' g''* the elevation of the front end of the plow-beams F F' can be adjusted so as to graduate the angle of the plow-beams and plows in accordance with the form of the plowshare or cultivator-tooth used, or the particular depth of plowing desired at the time, as regulated by raising and lowering the plow-standards H *h'*. As many plows as may be desired may be secured to the plow-beams F F' by means of the standards H *h'*. On the outer sides of these standards there is formed a serration corresponding to the serration on the inner sides of the nuts P P′, and the standards and nuts are securely held in place by screw-bolts passing through the plow-beams F F′. An elongated slot is cut in each of the plow-standards H *h*′, so as to allow the standards to be raised and lowered independently of the plow-beams. Between the standards H H′ are pivoted two connecting-bars, J J′, which keep the plows at a uniform distance apart. Whenever the wheels are moved in or out they carry the plows with them, and in order to accommodate the bars J J′ to the alteration of the distance between the beams, one or both have holes through them, so as to be fastened by means of a pin, *i*. On the rear end of the tongue A is a cross-piece, O, extending toward the sides, on each end of which one or more hooks may be attached for the suspension of the plow-beams and plows while the implement is being moved to or from work or from place to place, and not in operation. *a a′ a″ a‴* and *e e′* are common braces.

Having thus described my invention, what I claim as new, and desire to secure by Letters Patent, is—

1. In a wheel-cultivator, the axle-beam B, made extensible in the manner described, in combination with pivot-arms E E, plow-beams F F, and adjustable connection, substantially as shown and described.

2. The axle made in three parts, and provided with the serrated surfaces, and held by any suitable devices, substantially as shown and described.

3. In a straddle-row cultivator having a raised or arched axle, I claim the slots and bolts, in combination with the serrated surfaces, for the purpose of making the wheels extensible, substantially as set forth.

In testimony that I claim the foregoing as my own I hereby affix my signature.

WILLIAM B. RAPER.

Witnesses:
G. W. HOLMES,
A. C. FALCONER.